(12) United States Patent
Tseng et al.

(10) Patent No.: US 8,553,131 B2
(45) Date of Patent: Oct. 8, 2013

(54) SIX-AXIS MOUNT

(75) Inventors: Jeffrey Shie Ping Tseng, Tustin, CA (US); Hans Molin, Mission Viejo, CA (US); Todd William Kreter, Irvine, CA (US); Robert George Charnock, Anaheim, CA (US); Bradley Steven Stearns, Foothill Ranch, CA (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 416 days.

(21) Appl. No.: 12/793,040

(22) Filed: Jun. 3, 2010

(65) Prior Publication Data

US 2011/0298968 A1 Dec. 8, 2011

(51) Int. Cl.
*H04N 5/225* (2006.01)
*G02B 13/16* (2006.01)

(52) U.S. Cl.
USPC ............ 348/335; 348/340; 348/345; 348/348

(58) Field of Classification Search
USPC ............... 348/335, 340, 345, 348; 250/208.1; 257/290–292
See application file for complete search history.

(56) References Cited

U.S. PATENT DOCUMENTS

| | | | |
|---|---|---|---|
| 5,559,556 A | 9/1996 | Kagebeck | |
| 6,117,193 A | 9/2000 | Glenn | |
| 6,232,588 B1 * | 5/2001 | Naya | 250/208.1 |
| 6,481,003 B1 | 11/2002 | Maeda | |
| 6,590,658 B2 | 7/2003 | Case et al. | |
| 6,654,187 B2 | 11/2003 | Ning | |
| 2005/0104995 A1 | 5/2005 | Spryshak et al. | |
| 2005/0248680 A1 | 11/2005 | Humpston | |

FOREIGN PATENT DOCUMENTS

| | | |
|---|---|---|
| JP | 2006-293100 | 10/2006 |
| JP | 2006293100 A * | 10/2006 |
| JP | 2006-350372 | 12/2006 |
| WO | 01/44850 | 6/2001 |

* cited by examiner

*Primary Examiner* — Yogesh Aggarwal
(74) *Attorney, Agent, or Firm* — Crowell & Moring LLP

(57) ABSTRACT

Provided herein is a lens mount system and related process that allow for performing six-axis active alignment with a single joining step. This system and/or process simplifies the lens attachment in a manner that makes such attachment compatible with high volume manufacturing and/or full automation.

23 Claims, 16 Drawing Sheets

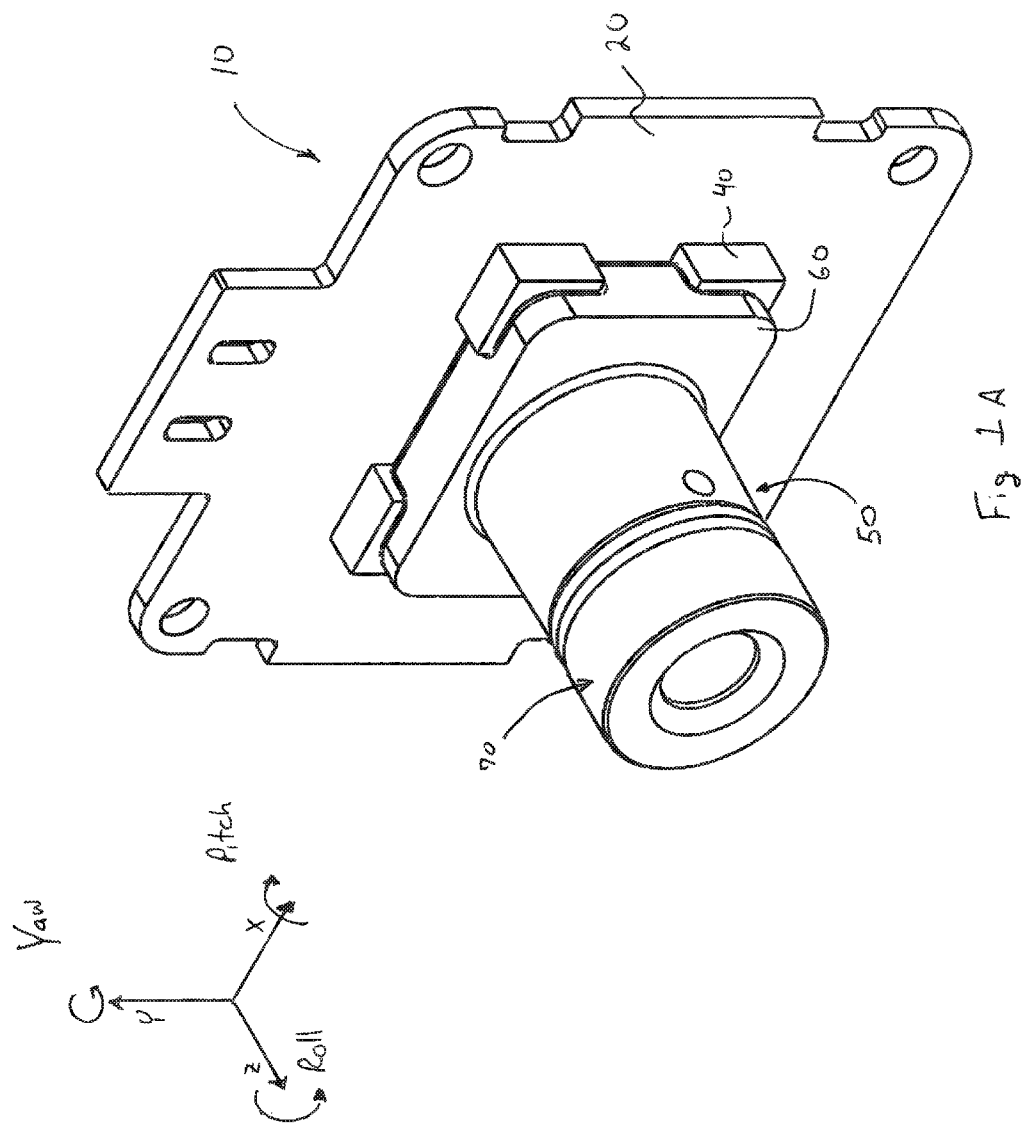

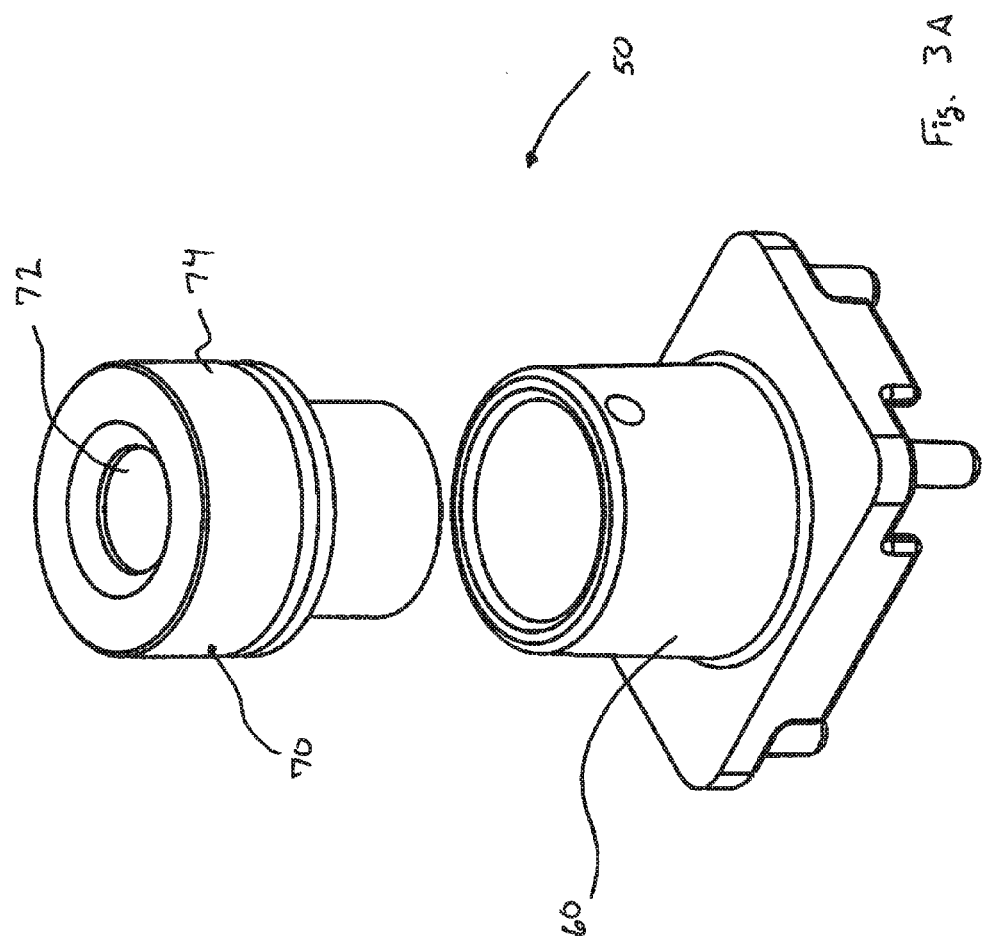

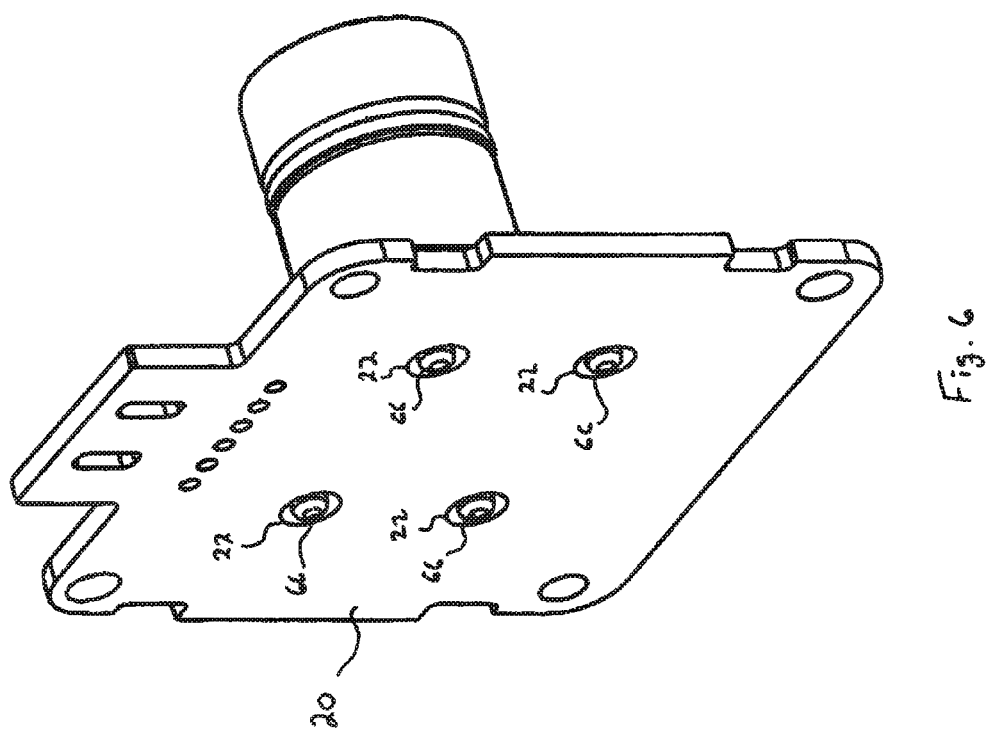

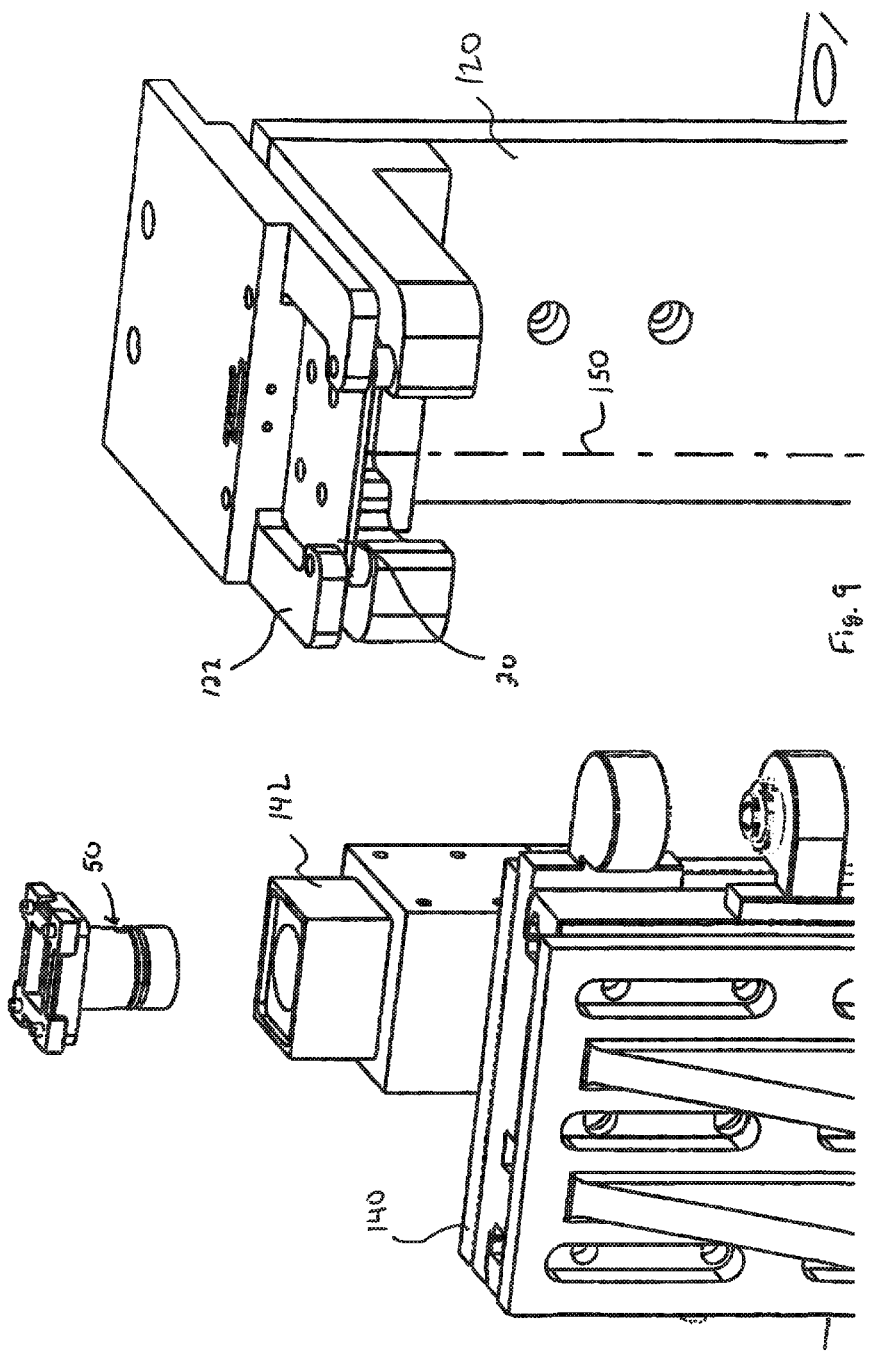

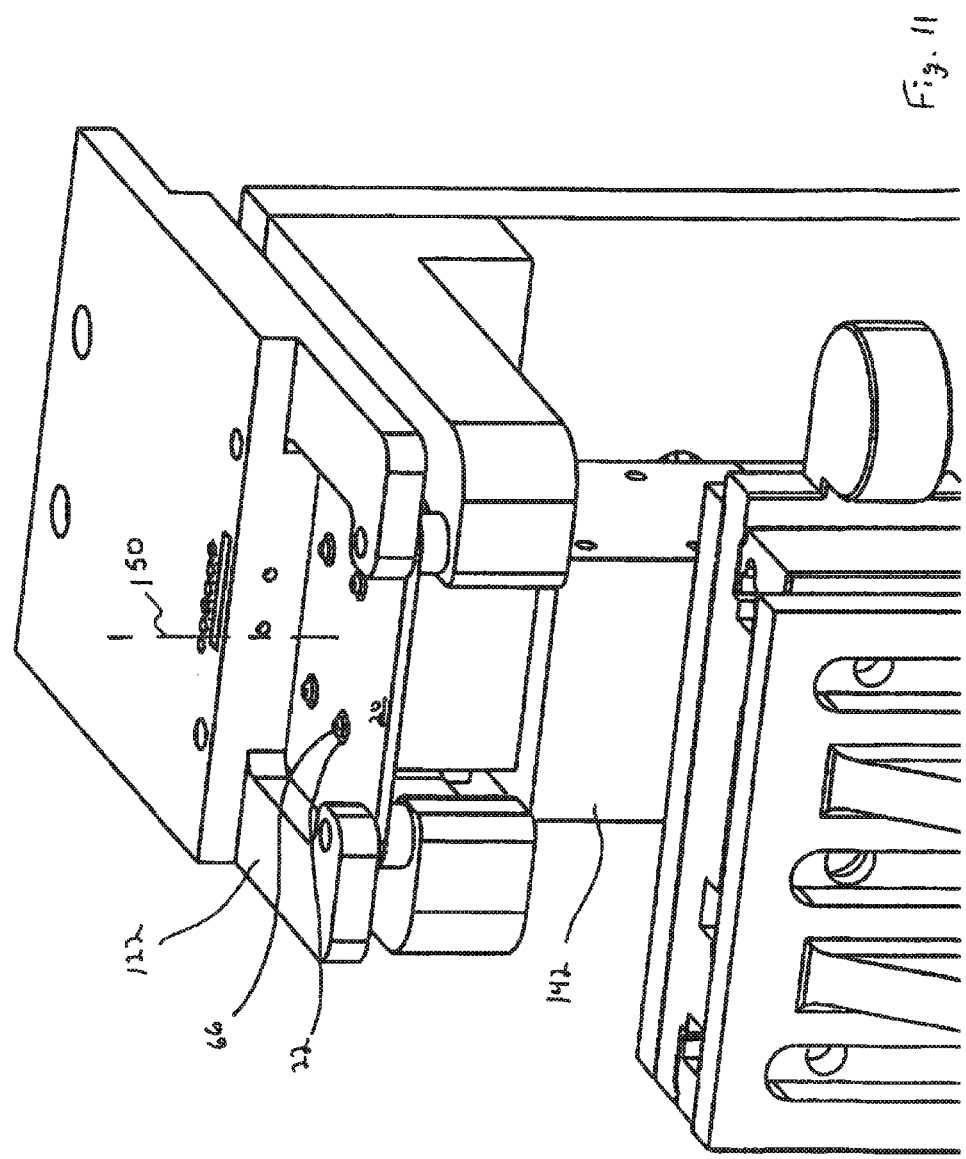

SIX-AXIS MOUNT

FIELD

The present disclosure pertains to imaging systems in general and more particularly to methods and systems for mounting an optical axis of an optical lens in an accurate desired alignment with an optical imager.

BACKGROUND

Increasingly, image sensing systems are being used for optical metrology (i.e., measurement) functions. For instance, image sensing systems may utilize various algorithms to calculate, inter alia, the angles, distances, curvatures, speeds, etc. of objects within an acquired image.

Such image sensing systems typically include a video camera, digital still camera or the like, which are capable of capturing images into digital signals (or potentially analog signals) for storage, manipulation and/or distribution. Such systems ordinarily include a lens or other image-forming element capable of capturing light from a scene/object and focusing/projecting that light onto a surface that is capable of sensing the light. This surface typically comprises an array of photo sensor elements, such as charge-coupled-devices ("CCDs") or complementary metal oxide semiconductor ("CMOS") photoreceptors.

These sensors typically comprise planar, rectangular matrices, or arrays, of photoelectric transducer elements fabricated on the surface of a semiconductor substrate, typically silicon, by various known photolithographic techniques, that are capable of converting the light energy incident upon them into electrical signals on an element-by-element, or pixel-by-pixel, basis. These signals, usually digital in nature, include information pertaining to, e.g., the intensity, color, hue, saturation, and other attributes of the incident light.

The sensor array substrate(s) is typically disposed on and electrically connected to a base substrate such as a printed circuit board (PCB). A lens structure is disposed over the sensor array typically supports one or more optical elements. This lens structure typically mounts to the base substrate/ PCB. The most common method for aligning the lens and optical sensor involves the lens and base substrate having corresponding, complementary mounting features adapted to engage each other such that, when engaged, the optical features of the sensor are aligned with the optical elements of the lens. Typically, the lens includes various projections arranged around its optical axis and the base substrate includes corresponding apertures or pedestals that mate with these projections.

In order to accurately align the lens and optical sensor, the tolerances of the individual components and the complementary mounting features need to be extremely tight. Maintaining such tight dimensional tolerances is difficult. Separate tolerances are present in the fabrication and assembly of the various components (e.g., optical properties of the lens elements, sensor to PCB mounting tolerances, lens to lens carrier mounting tolerances, etc.) and the final integration of these components (e.g., lens carrier to PCB mounting tolerances). Unless extremely tight dimensional tolerances are specified and maintained, during the fabrication and assembly of all of these components, tolerance stack ups tend to occur. Generally, such tolerance stack up can be maintained to within a few hundred microns in the Cartesian directions (e.g., XYZ directions) and to perhaps slightly more than 1° angularly about one or all of the Cartesian axes.

While such tolerances are acceptable for many applications, accurate optical metrology (i.e., measurement) functions typically require much tighter tolerances. To provide tighter tolerances, an active alignment process may be utilized where feedback from the optical sensor guides alignment. In such an active alignment method, the sensor is temporarily positioned loosely in about the desired position of alignment with the lens positioned loosely in about the desired position of alignment with sensor. The sensor is temporarily connected to a display to output a test scene or pattern, and the relative position of the sensor or lens is adjusted by a human or machine until the image of the test pattern produced on the display subjectively matches the test pattern, whereupon the position of the sensor relative to the lens is then fixed permanently in place.

Active alignment typically requires multiple alignment and securing/gluing steps. For instance, one prior design utilizes a two piece lens mount carrier. The first piece is a lens mount with internal threads; the second piece is a mechanical stand-off for attachment to the PCB. First, the lens is focused by being threaded into or out of the lens mount in the Z direction. Then the lens and the lens mount assembly are moved in the XY directions on top of the mechanical stand-off to correct for any lateral misalignment. The process requires a 3-step gluing process that includes tacking the lens inside the threaded mount, tacking the lens mount on the stand-off, and removing the complete assembly from an alignment setup for the final gluing and re-enforcement.

SUMMARY

Provided herein is a lens mount system and related process that allow for performing six-axis active alignment with a single joining step. This system and/or process simplifies the lens attachment in a manner that makes such attachment compatible with high volume manufacturing and/or full automation.

In a first aspect, a camera module is provided that allows for adjusting the position of a lens assembly in six axes relative to an imager that is mounted on a base substrate such as a PCB. In this aspect, an imager is mounted on a base substrate where the imager has a photo sensor array formed on a planar upper surface. Pluralities of mounting apertures are disposed about the imager and extend through the base substrate between its top surface and a bottom surface. These apertures are sized to receive a corresponding plurality of mounting posts of a lens support mount. Importantly, the size of these apertures is larger than the corresponding dimensions of the mounting posts permitting the mounting posts and the attached lens support mount to move in first and second and/or third Cartesian directions and/or partially rotate about two or more axes. The lens support mount includes a base to which the mounting posts are attached and supports a lens with one or more optical elements. In one arrangement, the lens includes a housing having an axial passageway extending there through. An optical element is disposed within the housing to project an image through the housing along a lens optical axis for disposition on the planar photo sensor array. An elastic gasket is disposed about the imager between the base of the lens supporting mount and the top surface of the base substrate. This elastic gasket separates the lens supporting mount from the top surface of the substrate. The elastic gasket also suspends the mounting post within the mounting apertures. Once the lens optical axis is aligned in a desired orientation with the photo sensor array, the suspended posts are adhered within the apertures fixing the position of the lens supporting mount relative to the PCB and imager. In one arrangement, the lens optical axis is perpendicular/normal to the surface and/or centered on the surface of the imager. However, this is not a requirement.

The elastic gasket separates the base of the lens support mount from the top surface of the base substrate by a sufficient distance to allow the lens support mount to rotate slightly such that the optical axis may be aligned with the surface of the imager. Further, the gasket permits compression in a direction normal to the surface of the imager. This permits focusing an image plane of the lens on the imager free of adjusting the position of the lens relative to the lens support mount. In one arrangement, the elastic gasket is non permeable gasket that allows for sealing the space between the imager and the lens once the lens support mount is affixed to the surface of the PCB.

In one arrangement, the gasket includes apertures through which the posts of the lens support extend. In such an arrangement, the gasket may also cover the apertures through the base substrate and thereby provide a glue stop function.

Typically, the mounting posts of the lens supporting mount are disposed around the optical axes of the lens and the optical imager. The number and spacing of these posts is typically identical to the number and spacing of the apertures within the PCB. The spacing of the posts and apertures may be regular or irregular so long as they correspond. The apertures in the PCB have a larger size than the posts. Typically, corresponding cross dimensions of the mounting apertures are at least 1.1 times the cross dimension of the mounting posts and more commonly at least 1.5 times the cross dimensions of the mounting posts. This permits movement of the lens support mount to align the optical axis of the lens with the photo sensor.

In another aspect, a method is provided for optically aligning an imager mounted on a base substrate with a lens. The method includes positioning a planar photo sensor surface of an imager mounted on a base substrate relative to a laser beam of a fixed laser. The imager is positioned and/or tilted until the laser beam is positioned in a desired orientation to the planar surface of the imager. Typically, an output image from the imager is utilized for positioning of the imager. Once the imager is correctly positioned, the imager's position is fixed, and the lens assembly is disposed over the imager such that the laser beam or other light/image source may project through the lens assembly and onto the imager via the lens. At this time, the position of the lens assembly may be adjusted to position the light source (e.g., laser) or image in a desired orientation to the planar surface of the imager. Such adjustment may include tilting the lens assembly in one or more axes to align the optical axis of the lens to be center to and/or normal to the planar surface of the imager. This may further include adjusting the position of the lens assembly in the X, Y and/or Z directions (e.g., substantially parallel to the surface of the base substrate) and/or rotationally about one or more axes. Once the light source or image is repositioned in the desired orientation with the planar surface of the imager, the lens assembly is aligned with the imager and may be moved in a direction normal to the planar surface to focus an image plane of the lens with the imager. This may further include projecting an image through the lens and focusing that image. In one arrangement, the laser or other usable light source may be utilized to project such an image. In any arrangement, once the image is focused, the position of the lens assembly may be fixed relative to the base substrate.

In one arrangement, the alignment of the lens assembly relative to the imager is performed while the PCB and imager are in a facedown position. In such an arrangement, mounting posts interconnecting the lens assembly relative to the PCB may be partially exposed through a back surface of the PCB, which may facilitate fixing the lens assembly relative to the base substrate.

BRIEF DESCRIPTION OF THE DRAWINGS

For a more complete understanding of the present disclosure and further advantages thereof, reference is now made to the following detailed description taken in conjunction with the drawings in which:

FIG. 1A illustrates a perspective view of a camera module.

FIG. 3A illustrates an exploded view of a lens assembly utilized with a camera module.

FIG. 6 shows a rear view of the PCB once the lens assembly is engaged on the front surface of the PCB.

FIG. 9 illustrates aligning the imager relative to a reference laser.

FIG. 11 illustrates aligning a lens assembly relative to the imager.

DETAILED DESCRIPTION

Reference will now be made to the accompanying drawings, which at least assist in illustrating the various pertinent features of the presented inventions. In this regard, the following description is presented for purposes of illustration and description. Furthermore, the description is not intended to limit the disclosed embodiments of the inventions to the forms disclosed herein. Consequently, variations and modifications commensurate with the following teachings, and skill and knowledge of the relevant art, are within the scope of the presented inventions.

Provided herein are systems and methods for mounting a lens or other image forming element relative to an optical imager/sensor array in precise optical alignment. The provided systems and methods (i.e., utilities) simplify the connection of these elements and substantially eliminates the tolerance stack up issues associated with systems and methods of the prior art.

Figure 1B:
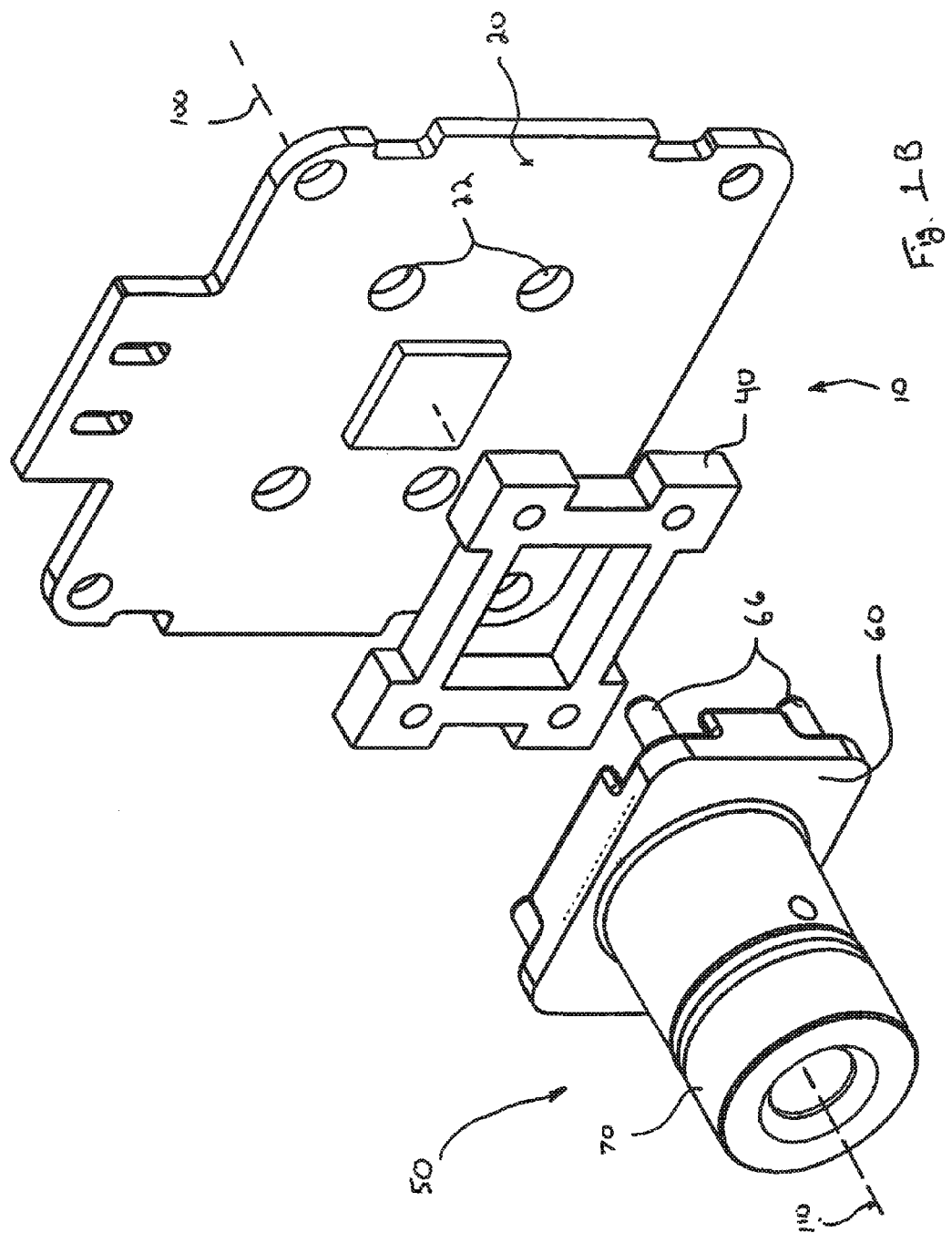
FIG. 1B illustrates an exploded view of the camera module of FIG. 1A.

FIGS. 1A and 1B illustrate a perspective and exploded perspective view, respectively, of a camera module 10 for incorporation into various different imaging devices. Such imaging devices include, without limitation, video imaging devices as well as still imaging devices. In this regard, the camera module 10 may be incorporated into various different casings/housings. The module includes a number of major components. These components include a base substrate or printed circuit board 20, which supports an imager 30, a lens assembly 50, and an elastic gasket structure 40.

Figure 2A:
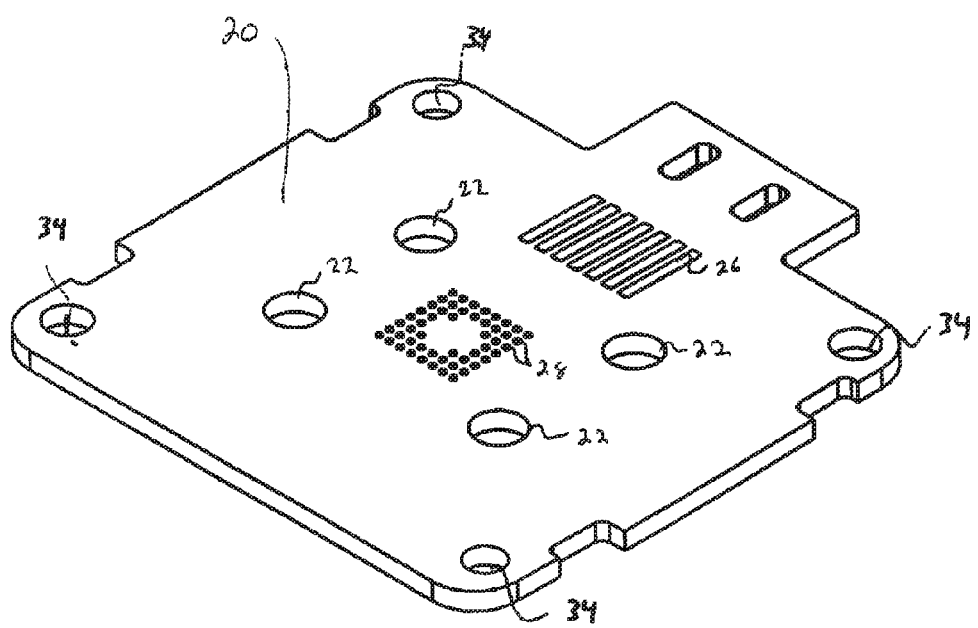
FIG. 2A illustrates a perspective view of a PCB.
Figure 2B:
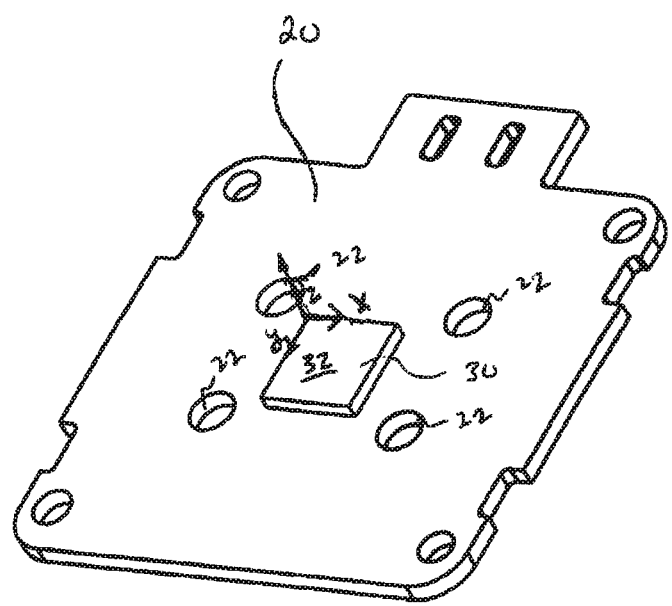
FIG. 2B illustrates a perspective view of the PCB of FIG. 2A, including an imager.

FIGS. 2A and 2B illustrate the PCB 20 and PCB and imager 30, respectively. As will be appreciated, the printed circuit board may be formed of any appropriate substrate material as known in the art. For instance, the PCB may be made of ceramic materials, silicon based materials and/or composite materials (e.g., resin and fiberglass). In any arrangement, the PCB 20 typically includes a plurality of conductive traces 26 to which circuitry of the imager 30 is electrically connected by a plurality of fine conductive wires or contact points 28 such as pads on the upper surface of the PCB 20. These connections carry electrical power and signals between the imager 30 and the circuitry of the PCB.

The PCB 20 also includes a plurality of various apertures 34 for connecting the PCB to, for example, the camera case. In addition, the PCB includes a plurality of lens mounting apertures 22 that are disposed about the imager 30. These lens mounting apertures secure the lens assembly 50 relative to the PCB, as discussed herein.

The bottom surface of the imager may include a plurality of solder pads or balls that connect to corresponding contact points 28 formed on the top surface of the PCB 20. Such solder balls function as electrical input/output terminals for the imager 30. The imager is defined by a semiconductor chip that typically has a two-dimensional rectangular sensor array that includes a large number of photo sensors that are each capable of converting light incident upon it into an electrical signal that is proportional to the intensity, and in the case of a color camera or the like, the color and hue of the incident light. The individual photo sensors may be, among others, CCDs or CMOS devices formed by techniques known in the art. Signal processing circuitry (not shown) is typically provided external to the sensor for converting the signals generated thereby into a digital signal capable of being stored, processed or distributed.

It will be appreciated that while the imager is interconnected to the top surface of the typically planar PCB 20, the resulting interconnection between these elements 20, 30 may result in slight canting of the planar upper surface 32 of the imager 30. That is, this planar upper surface 32 of the imager 30 may be slightly canted relative to the planar surface of the PCB 20. To achieve highly accurate imaging, it is desirable to account for such variations when mounting the lens assembly 50 relative to the PCB 20.

That is, for the imager to accurately sense images, the sensor array must align with a lens or other image forming device such that the planar upper surface 32 of the imager 30 is substantially coplanar with a focal plane of the lens. Otherwise, the image will be out of focus. Furthermore, the center of the imager will typically be centered on the optical axis of the lens or the image will be off center or only partially sensed. Further, the horizontal and vertical axes X and Y of the rectangular imager 30 will typically be aligned with the horizontal and vertical axes of the scene imaged by the lens, or the scene sensed by the imager may be canted relative to the original scene. However, it will be appreciated that in certain applications it may be desirable to offset the focal plane and/or optical axis of the lens relative to the imager. This may allow, for example, softening hard edges in a sensed image. Therefore, while discussed primarily herein as aligning the optical axis to be centered with and normal to the imager, it will be expressly understood that the systems and methods provided herein allow for aligning the optical axis of the lens in any desired orientation with the imager.

Generally, the imager optical axis 100 is a reference axis that is centered on the rectangular surface of the imager in the X, Y directions and extends normal (e.g., perpendicular) to the planar surface 32 in the Z direction. See FIG. 1B. Accordingly, optically aligning the imager 30 with the lens assembly 50 may involve fixing the position of the optical axis 110 of the lens assembly 50 with the optical axis 100 of the imager 30 (or in another desired orientation with the photo sensor). Typically, this requires the controlled positioning of the lens assembly 50 relative to the imager and PCB 20 in six directions of movement, three linear along the X, Y and Z axes and three angular, or rotational, about those three axes. That is, alignment of the optical axes 100, 110 and focusing of the lens focal plane with the surface of the imager typically requires movement of the lens assembly 50 in three Cartesian axes (X, Y and Z) as well as the rotational movement about these axes in what may be termed the pitch, yaw and roll directions. In this regard, highly accurate alignment and mounting requires six axis control between the lens assembly 50 and the PCB 20.

FIG. 3A illustrates the lens assembly 50. As shown, the lens assembly includes a lens mount subassembly 60 and a lens 70. The lens 70 includes one or more optical elements 72 and an annular housing 74. As shown, the housing 74 surrounds the optical element(s) 72 and interconnects the lens to the lens mount subassembly 60.

Figure 3B:
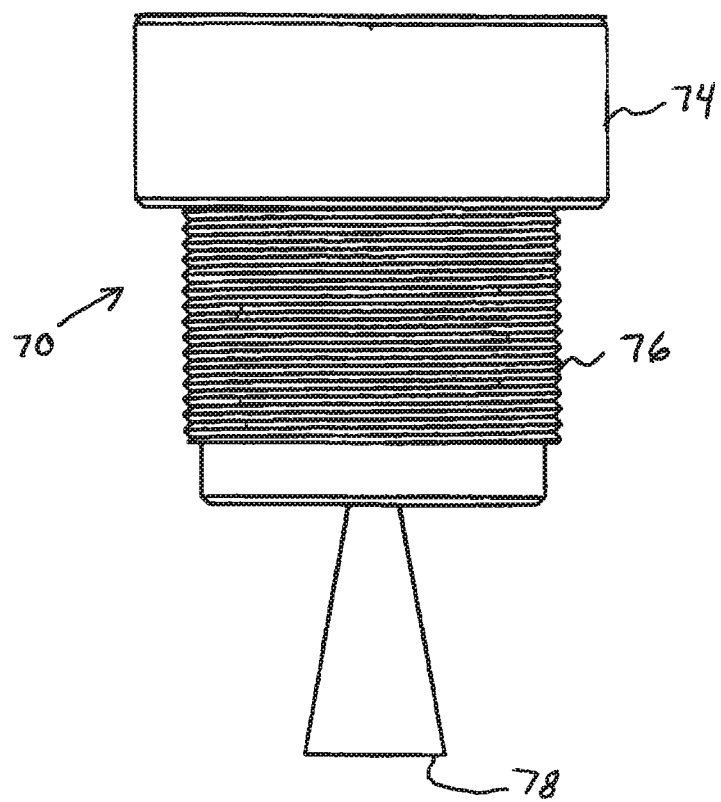
FIG. 3B illustrates a lens carrier.

The optical element(s) 72 is operative to project an image onto a surface. Stated otherwise, the lens is operative to refract received light onto a focal plane 78, as illustrated in FIG. 3B. The lens will focus light reflected or emitted by an element or scene onto the focal plane 78, which is orthogonal to the optical axis Z of the lens and located a specific distance (i.e., the focal length) behind the optical element or the bottom of the housing (e.g., back focal length). The light reflected or emitted by the element or scene may be thought to align a plane that is defined by two orthogonal axes, horizontal axis X and a vertical axis Y, that intersect at the center of the scene, and to be orthogonal to a third, intersecting axis Z that is perpendicular to the X and Y axes. This plane, may in some embodiments, lie directly on the surface of the optical imager.

Figure 3C:
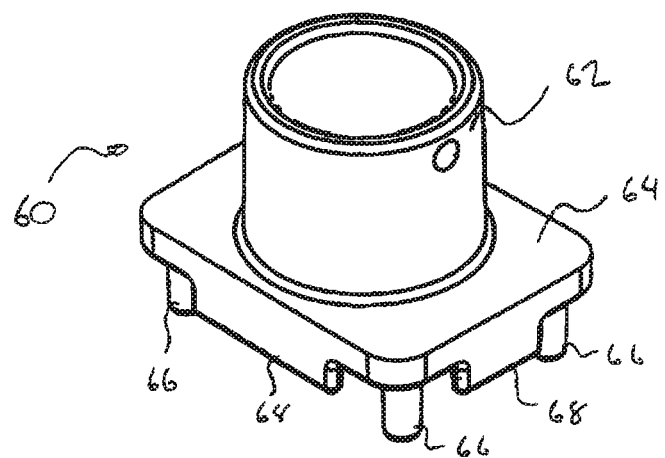
FIG. 3C illustrates a perspective view of a lens mount subassembly of the lens carrier.

The lens mount subassembly 60 includes a focal tube or barrel 62 that is attached perpendicular to a base 64. See FIG. 3C. This barrel has an axial passage running the length thereof and opens through the base. An inside diameter of the barrel 62 is adapted to receive the lower end of the housing 74. In this regard, the housing 74 has a lower barrel 76 with an outside diameter that substantially matches the inside diameter of the barrel 62. Again, this lower barrel of the lens 70 is hollow such that the optical element 72 may project light there through. Though illustrated as being circular, it will be appreciated that the upper and lower barrels of the lens and lens mount subassembly may utilize other corresponding shapes, which are considered within the scope of the present disclosure.

The outside surface of the housing 74 and the lens mount subassembly barrel 62 may include mating threads to allow positioning of the lens 70 relative to the lens mount subassembly 60. However, aspects of the present disclosure allow for fixedly interconnecting the lens 70 relative to the lens mount subassembly 60 and subsequently adjusting the focal distance of the optical element(s) 72 relative to the underlying imager using a compressible gasket, as is discussed herein. In this regard, the housing 72 may be affixed relative to the subassembly 60 such that the focal length of the optical element(s) is fixed prior to connection of the lens assembly 60 with the PCB 20. In another arrangement, the upper and lower barrels may be free of threads and provide a friction/slip fit arrangement. In any arrangement, these elements 60, 70 may be fixedly connected using adhesives or, for instance, mechanical fasteners (e.g., screws) prior to connecting the lens assembly 50 to the PCB 20. Generally, the back focal length of the lens will be preset to be substantially equal to the expected distance (i.e., optical length) from the bottom of the lens barrel 74 to the surface of the underlying optical imager 30 when the lens assembly 50 is connected to the PCB 20. As discussed herein, fine-tune adjustment of this optical length is provided utilizing the elastic gasket 40.

The lens mount subassembly 60 engages the lens 70 with the PCB such that the lens may project an image through the internal surface of the lens assembly 50 and onto the attached imager 30. Further, it is desirable that the lens mount subassembly provide a means for adjusting the position of the optical axis of the lens 70 relative to the optical axis of the imager 30. In the present arrangement, the lens mount subassembly includes a plurality of mounting posts 66 connected to the base 64. These mounting posts are adapted for receipt within the lens mounting apertures 22 extending through the PCB 20 as illustrated in FIGS. 2A and 2B. Generally, these mounting posts 66 extend substantially parallel to the optical axis of the lens 70 and are arrayed around the optical axis. Furthermore, these mounting posts 66 have distal ends that extend beyond the focal plane of the lens. In this regard, the posts are long enough to extend at least partially through the PCB 20 while the focal plane 78 of the lens 70 displays on the surface of the imager 30. Though illustrated as being circular posts, it will be appreciated that other configurations are possible.

In the present non-limiting embodiment, the circular mounting posts 66 are adapted for receipt within identically spaced circular mounting apertures 22 of the PCB 20. Furthermore, the radius of the mounting apertures 22 are equal to the radius of the mounting posts 66 plus the worst case tolerance stack up for all the components involved in the assembly of the camera module 10. That is, there is play between the mounting posts 66 and the mounting apertures 22 that allows for adjusting the position of the subassembly 60 in the X and Y directions (e.g., laterally) as well as permitting some rotation of the mounting assembly 60 about the three Cartesian axes. Generally, the radius, diameter or other cross-dimension of the mounting apertures will be at least 1.1 times the corresponding dimension of the mounting posts. More typically, the mounting apertures will be at least 1.5 times the corresponding dimension of the mounting posts. Though shown as being regularly spaced about the imager, it will be appreciated that the mounting posts and apertures may have any corresponding spacing (e.g., irregular). Further, the post and apertures need not be circular in cross-section.

In addition to the mounting posts, a plurality of positioning stops or sidewalls are also interconnected to the base 64 of the lens mount subassembly. See FIG. 3C. These sidewalls 68 limit the axial positioning (e.g., along the Z axis) of the lens assembly 50 relative to the PCB 20. That is, the bottom surfaces of these sidewalls 68 may rest on a top surface of the PCB 20 and thereby prevent additional axial movement of the lens assembly relative to the PCB 20.

Figure 4:
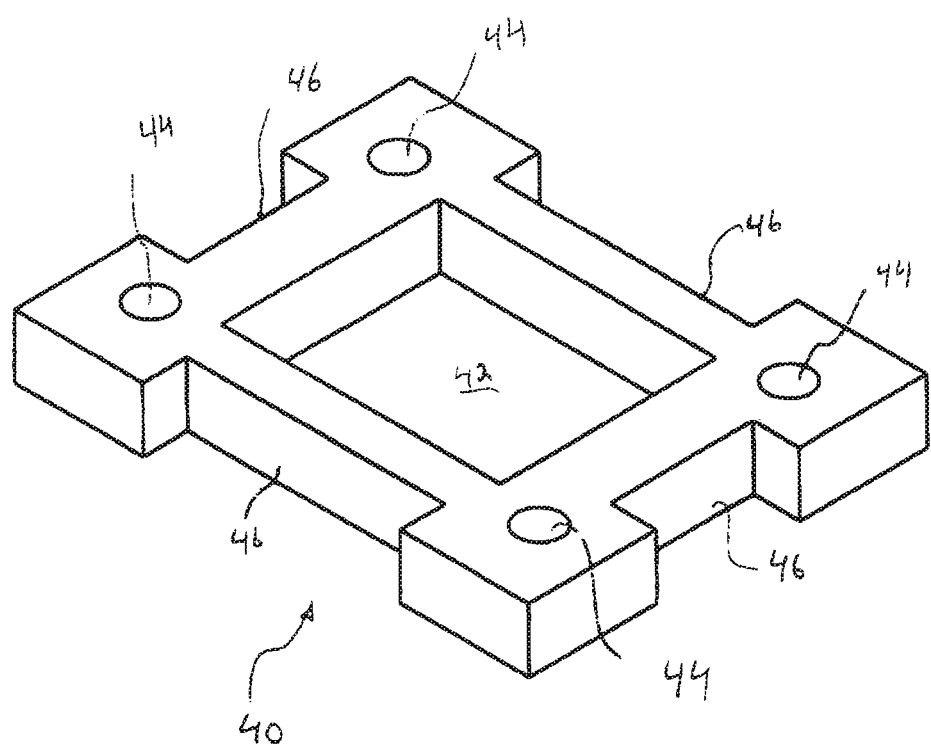
FIG. 4 illustrates a gasket utilized with the camera module.
Figure 5A:
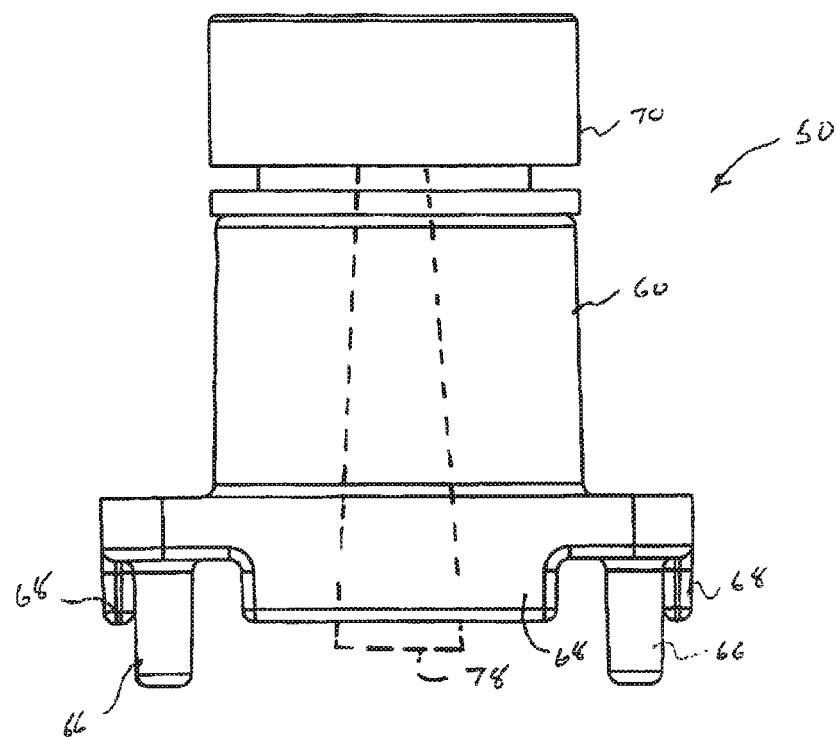
FIG. 5A illustrates a lens assembly free of the gasket.
Figure 5B:
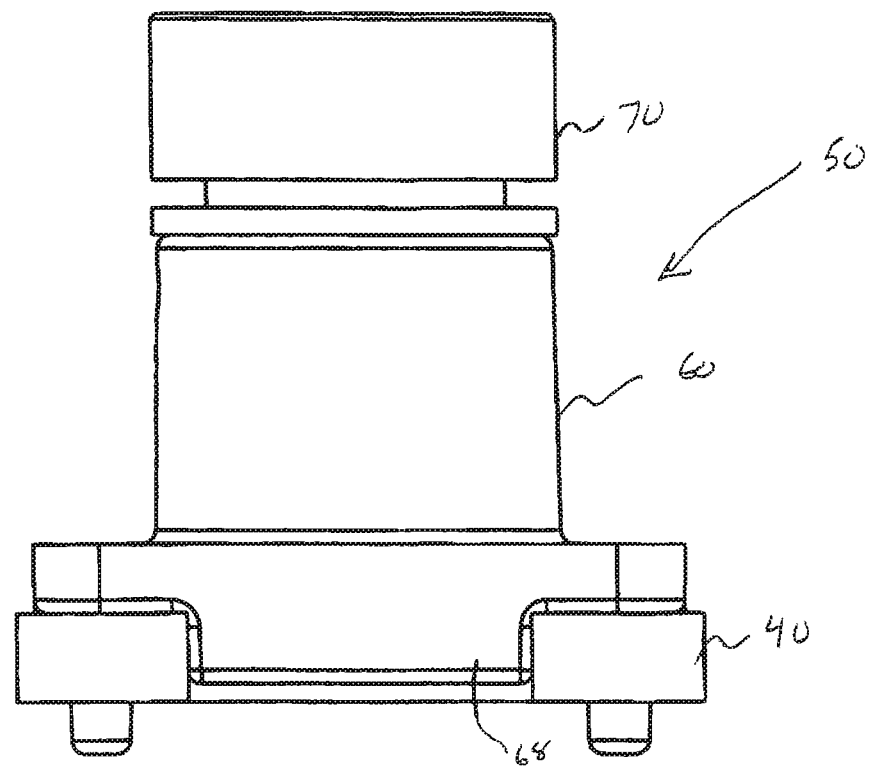
FIG. 5B illustrates the lens assembly including the gasket of FIG. 4.

FIG. 4 illustrates an elastic gasket 40 that is adapted for positioning between the lens assembly 50 and PCB 20. (See also FIG. 1B) As shown, the elastic gasket 40 includes a central aperture 42. This aperture is sized to surround the imager 30 when the gasket 40 is placed on the surface of the PCB 20. Furthermore, the size of the aperture 42 allows movement of the lens assembly 50 relative to the PCB without contacting the imager 30. As shown, the elastic gasket 40 also includes a plurality of apertures 44 that are adapted to receive the mounting posts 66 of the lens mount assembly 60. This is illustrated in FIGS. 5A and 5B where the lens assembly is shown without the gasket and with the gasket, respectively. Beneficially, the gasket surrounds the mounting posts and, upon disposition on the base substrate, covers the portion of the apertures in the base substrate around the posts. This provides a glue stop during attachment. In addition, each outside edge surface of the elastic gasket 40 has a recess 46 that receives the sidewall 68 extending down from the base 64 of the lens mount subassembly 60. In this regard, the gasket is not disposed between the bottom edges of the sidewalls 68 and the top surface of the PCB such that the sidewalls may provide a stop in the Z direction, as discussed above.

The elastic gasket 40 has a thickness that is greater than the height of the sidewalls 68 that extend from the bottom of the base 64 of the lens mount assembly. In this regard, when the elastic gasket 40 engages the mounting posts 66, a bottom surface of the gasket extends beyond the bottom surface of the sidewalls 68. See FIG. 5B. Once all the components are assembled, as illustrated in FIG. 1A, the lens assembly 50 floats on top of the elastic gasket 40, which is sandwiched between the bottom of the lens assembly 50 and the top surface of the PCB 20. This floating arrangement in conjunction with the use of mounting apertures 22 that have a radius that is greater than the corresponding radius of the mounting posts (i.e., suspended within the apertures) allows for adjusting the pitch, yaw and roll of the lens assembly 50 relative to the imager 30. That is, if necessary, the lens assembly 50 may be canted relative to one of these axes (e.g., the pitch axis), which is permitted by compressing one side of the elastic gasket 40. However, when compressing one side of the gasket 40, the other side of the gasket maintains a seal between the bottom of the lens mount subassembly 60 and the PCB 20. In this regard, the gasket 40 may act as an environmental seal for the imager 30. That is, once the lens assembly 50 is interconnected to the PCB 20, the enclosed area between the lens and the optical imager is sealed from outside contamination. In addition, the gasket may be compressed in an axial direction (e.g., along the imager axis) to adjust the position of the lens focal plane relative to the surface of the imager.

The gasket may be made of any material that provides a desired compliancy. However, it may be preferable that the gasket be a material that is substantially non-permeable. As noted, in addition to permitting rotational movement about the three Cartesian axes as well as linear movement along at least one axis, the gasket 40 also provides an environmental seal for the imager 30. Therefore, it is desirable that the gasket be non-permeable to prevent, for instance, moisture infiltration into the area between the imager and the lens. In one arrangement, the gasket is a closed-cell foam. In other arrangements, various neoprene rubbers and/or other materials may be utilized.

The gasket thickness is such that the optical axis of the lens assembly 50 may be canted at least about ±3° and more typically ±5° relative to the PCB. For instance, in reference to FIG. 5B, the bottom surface of the gasket 40 may extend beneath the bottom surface of the sidewall 68 to provide the necessary give to permit canting. In any arrangement, this thickness beyond the bottom of the lens assembly is enough to account for the tolerance variation in the manufacture of the optical lens 72 (e.g., the focal length of the lens), as well as the tolerances of the connections between the various different components, including the lens carrier, mounting subassembly and the lens assembly to the PCB.

Once the gasket, lens assembly and PCB are connected, the four mounting posts 66 of the lens subassembly 60 extend through at least a portion of the lens mounting apertures 22. See FIG. 6. In the present embodiment, the bottom surface of the gasket 40 seals the bottom of the apertures 22, which limits the amount of adhesive that is utilized to affix the posts 66 within the mounting apertures 22. As will be discussed herein, upon correctly aligning the optical axis 110 of the lens assembly with the optical axis 100 of the imager, a light curable epoxy or other adhesive may be disposed within the area between the posts and their respective apertures and cured. Once cured, the four posts 66 effectively hold the lens assembly 50 relative to the PCB 20. In this regard, it will be appreciated that the posts 66 are designed to meet mechanical strength requirements to hold the lens assembly 50 with minimal misalignment throughout the life of the product.

As noted above, for metrology functions, such as angle, distance, speed and/or curvature measurement, the alignment of the optical axes 100, 110 is critical. For instance, it is desirable that the alignment accuracy be less than 10 micrometers in the Cartesian axes and less than 1° in the rotational axes. Accordingly, provided herein is an active alignment system that allows for utilizing an output of the imager 30 during the interconnection process of the lens assembly 50 to the PCB 20 that ensures accurate alignment of the optical axes 100, 110.

Figure 7:
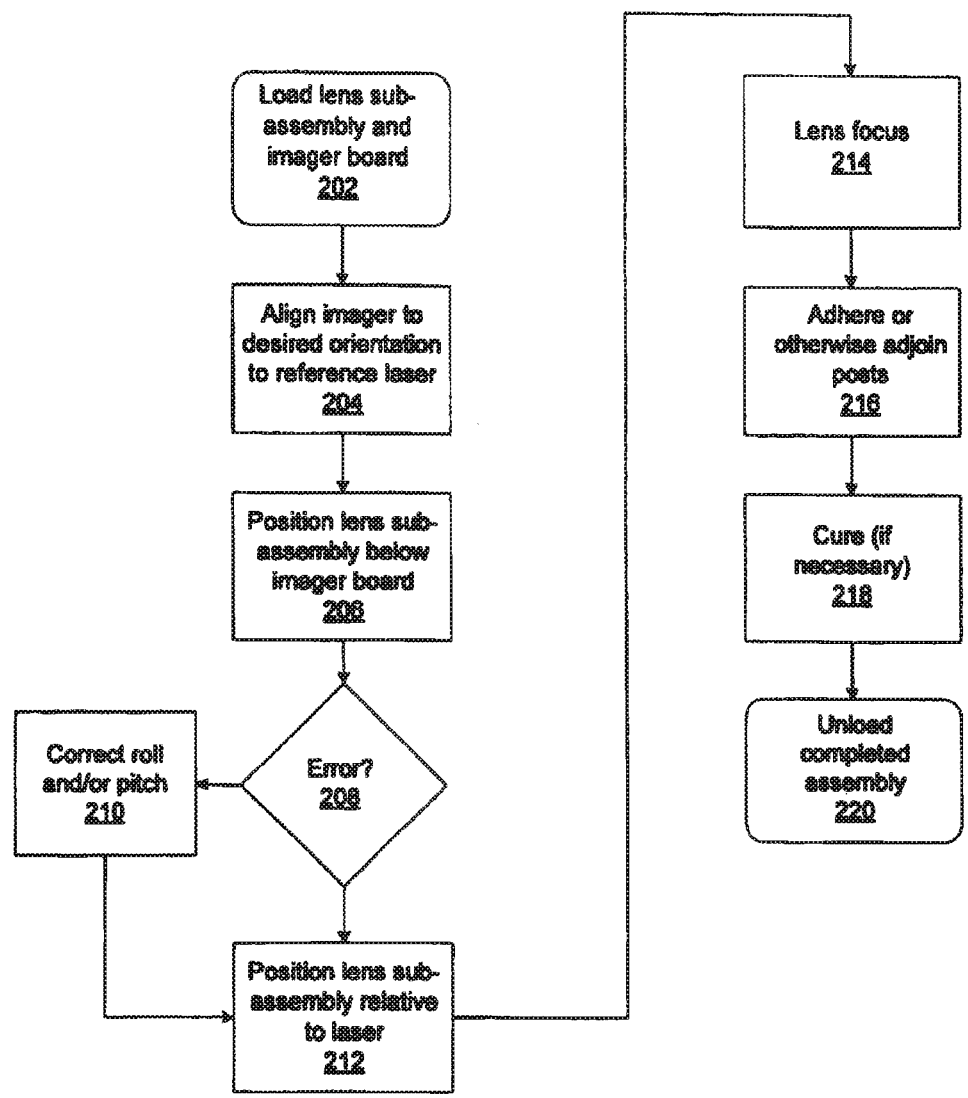
FIG. 7 illustrates a flow sheet of an active alignment process.

The active alignment process for aligning the optical axis of the imager 30 with the optical axis of the lens assembly is illustrated in FIG. 7. As shown, the process includes loading the lens subassembly and the imager board onto mounting apparatuses (202). The imager is then centered (204) relative to a reference laser beam. The lens subassembly is then moved into position (206) underneath the imager such that the laser may project through the lens of the lens assembly. An output of the imager is then monitored (208) to determine if there is an alignment error between the laser and the imager. Specifically, the determination is made as to whether the laser is disposed normal to the imager after passing through the lens. If not, the lens assembly is moved (e.g., tilted) to correct for pitch or roll error (210). Once the laser is projecting through the lens and is normal to the surface of the imager, the lens assembly may be moved in the XY directions to center (212) the laser at the center of the imager. At this time, the lens assembly is positioned such that light received through the lens is centered on the imager and the optical axis of the lens is normal to the surface of the imager. That is, the optical axis of the lens aligns with the optical axis of the imager.

However, while the optical axis of the lens aligns with the optical axis of the imager, the focal plane of the lens may not be coincident to the surface of the imager. Accordingly, the process further includes focusing the lens. This process (214) may entail projecting one or more images through the lens and monitoring the output of the imager to properly focus the image. Focusing is achieved by moving the lens assembly along the aligned optical axes. At this time, an adhesive such as an epoxy fixedly interconnects the lens assembly relative to the PCB 20 while the optical axes remain aligned and the lens remains in focus. Once adhered (216) and cured (218), the completed assembly may be removed (220) from the mounting apparatuses.

Figure 8:
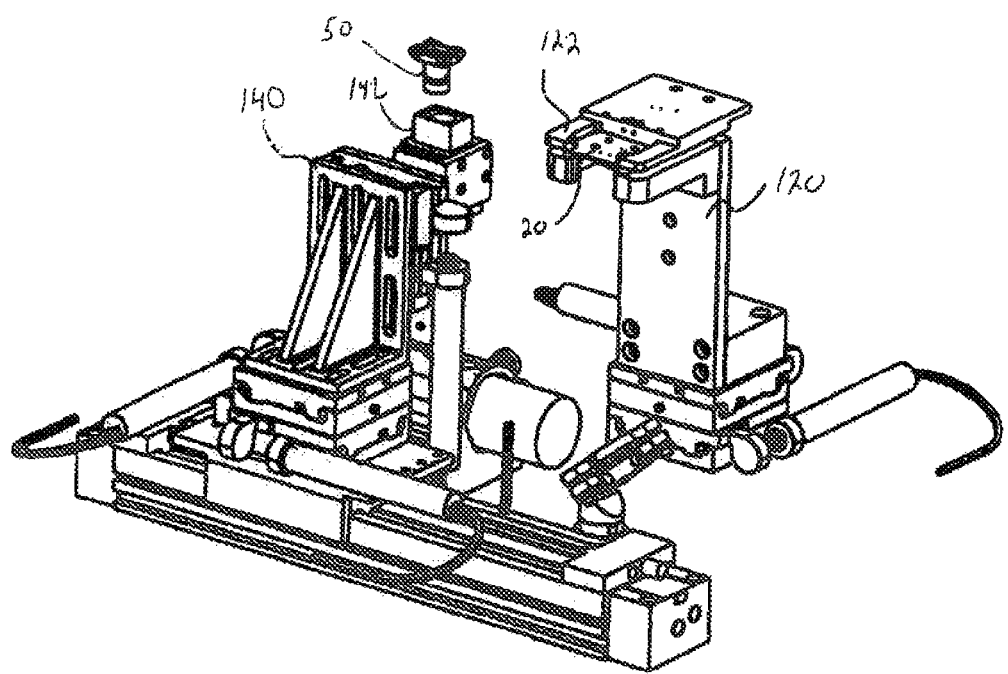
FIG. 8 illustrates a 6 axis mounting assembly.

FIGS. 8-11 more fully illustrate the process of FIG. 7. Initially, the PCB and supported imager 30 are loaded into a PCB mounting chuck 122 as illustrated in FIG. 8. Specifically, the PCB 20 and imager 30 are positioned in a facedown position such that the rear side of the PCB 20 is exposed. This facilitates adhesion of the mounting posts 66 of the lens assembly 50 within the mounting apertures 22 of the PCB 20, as is more fully discussed herein. The PCB mounting chuck 122 is part of a three-axis controllable mounting apparatus 120. In the present arrangement, the mounting chuck 122 engages the four corner apertures 34 of the PCB 20. See also FIG. 2A. In this regard, the PCB is rigidly interconnected with the mounting apparatus 120. At this time, one or more connections may be made with, for instance, electrical pads 26 on the PCB 20 to provide electrical power and electrical signals to and receive an output signal from the imager 30. The output signal of the imager may be provided to a display and/or a computer control that may allow for three-axis control of the mounting apparatus 120. Such control may be manual or fully automated.

Figure 10A:
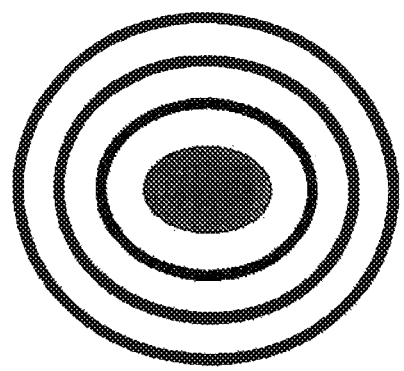
FIGS. 10A and 10B illustrate the output of the imager relative to a reference laser.
Figure 10B:
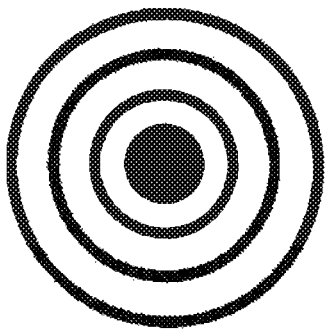

At this time, a circular collimated laser beam from a fixed reference laser 150 is projected onto the surface of the imager 130. See FIG. 9. This laser beam 150 is utilized as an optical reference axis for the imager. For instance, the imager 30 may be centered to the reference laser beam in the X and Y Cartesian directions. That is, the output of the imager is utilized to identify when the laser beam is at a direct center thereof. In addition to determining the center of the imager 30, the laser beam is also utilized to determine the canting, if any, of the imager relative to the PCB. FIGS. 10A and 10B illustrate the output of the imager in relation to the collimated laser. As shown in FIG. 10A, when the planar surface 32 of the imager 30 is canted relative to the PCB 20, the circular collimated laser generates a series of elliptical images (i.e., a circular fraction pattern). When measuring the long and short axes of one of the elliptical images, the apparatus 120 may be tilted in one or more directions in order to generate a true circular image, as illustrated in 10B. That is, once the output generates a circular image that is centered at the center of the imager, the reference axis defined by the laser 150 is perpendicular (i.e., normal) to the imager 30. That is, the optical axis 100 of the imager is aligned with the laser beam 150 of the fixed reference laser. At this time, the PCB 20 and imager 30 are positioned for receipt of the lens assembly 50.

As shown in FIG. 8, the lens assembly 50 is also receivable within a lens chuck 142. This lens chuck 142 is likewise interconnected to a three-axis controllable lens mounting apparatus 140. This lens mounting apparatus 140 is operative to move in the X, Y, Z directions as well as tilt/rotate about all three Cartesian axes. Once the PCB is properly oriented (i.e., normal to the reference laser), the lens chuck 142 is positioned below the PCB 20 such that the mounting posts 66 of the lens assembly 50 are below the top surface of the PCB 20. The lens chuck 142 is then advanced in the Z direction to engage the posts 66 through the apertures 22 and the PCB 20. See FIG. 11. In addition, the lens assembly 50 is advanced to a position where the gasket 40 is partially compressed around its periphery. At this time, the laser 150 projects through the lens of the lens assembly 50. The lens mounting apparatus 140 is then moved in the X and Y directions until the laser is again centered on the optical center of the imager, as well as being perpendicular to the imager plane. In this regard, pitch and roll error correction may be performed first by minimizing the error of a pattern generated by the laser beam similar to that as discussed above. Lateral centering in the X and Y directions is performed by moving the lens assembly until the reference laser is centered in the imager. Necessarily, the mounting posts move laterally within the lens mounting apertures. At this time, the optical axis 110 of the lens is aligned with the imager. However, additional focusing of the focal plane of the lens assembly 50 relative to the surface of the imager 30 may be required. That is, the lens assembly may have to be focused in the Z direction. At this time an image (e.g., a collimated pattern or image with a focal distance of infinity) may be projected (e.g., using the laser or other source) through the lens. This image may be focused by adjusting the Z position of the lens assembly 50 relative to the PCB 20. Once the focus is maximized, the position of the lens assembly relative to the PCB and imager 30 is accurately aligned.

Importantly, the compressibility of the gasket allows movement of the lens assembly in the Z direction. Further, as the gasket is initially partially compressed, the gasket permits positive or negative movement along the Z axis.

In order to maintain the positional relationship between these elements, a light curable epoxy is applied to the backside of the PCB in the mounting apertures 22 around the mounting posts 66. By exposing the back surface of the PCB 20, there is nothing in the way of application of this adhesive, and therefore, this application may be automated. Further, in one arrangement, a light curable adhesive permits rapidly curing the adhesive. However, it will be appreciated that other adhesives or other joining methods may be utilized. For instance, welding or soldering may be utilized in various applications.

The foregoing description of the presented inventions has been presented for purposes of illustration and description. Furthermore, the description is not intended to limit the inventions to the forms disclosed herein. Consequently, variations and modifications commensurate with the above teachings, and skill and knowledge of the relevant art, are within the scope of the present invention. The embodiments described hereinabove are further intended to explain best modes known of practicing the inventions and to enable others skilled in the art to utilize these inventions in such or other embodiments and with various modifications required by the particular application(s) or use(s) of the presented inventions. It is intended that the appended claims be construed to include alternative embodiments to the extent permitted by the prior art.

The invention claimed is:

1. A camera module, comprising:
    an imager mounted on a base substrate, the imager having a planar photo sensor array;
    a plurality of mounting apertures disposed about the imager and extending through the base substrate;
    a lens supporting mount, including:
        a base having a plurality of mounting posts spaced for suspended receipt within the mounting apertures; and
        a lens disposed proximate to the upper side of the base, wherein the lens is mounted to project an image along a lens optical axis for disposition on the planar photo sensor array; and
    adhesive disposed about the mounting posts and affixing the mounting posts within the mounting apertures, wherein the lens optical axis is disposed in a desired alignment with the photo sensor array and a focal plane of the lens is disposed on the planar photo sensor array,
    wherein the mounting posts and the mounting apertures have identical spacing, and
    wherein the mounting posts have a cross-dimension that is less than a corresponding cross-dimension of the mounting apertures.

2. The apparatus of claim 1, wherein the corresponding cross-dimension of the mounting apertures is at least 1.5 times the cross-dimension of the mounting posts.

3. The apparatus of claim 1, further comprising:
    an elastic gasket disposed about the imager and between the base of the lens supporting mount and the top surface of the base substrate, wherein the elastic gasket separates the lens supporting mount from the top surface to suspend the mounting posts in the mounting apertures, wherein the elastic gasket is continuous about an enclosed aperture, wherein the imager is disposed within the enclosed aperture.

4. The apparatus of claim 3, wherein the mounting posts pass through the elastic gasket, and wherein portions of the elastic gasket surrounding the posts cover portions of the mounting apertures surrounding mounting posts.

5. The apparatus of claim 3, wherein the elastic gasket is compressible permitting movement of the lens supporting mount along the optical axis of the imager prior to the mounting posts being adhered within the mounting apertures.

6. The apparatus of claim 5, wherein the elastic gasket is at least partially compressed about the entirety of the enclosed aperture.

7. The apparatus of claim 3, wherein the elastic gasket comprises a non-permeable material.

8. The apparatus of claim 7, wherein the elastic gasket comprises a closed cell foam.

9. The apparatus of claim 1, wherein said optical axis of said lens is normal to the surface of said planar photo sensor array.

10. A method for optically aligning an imager mounted on a base substrate with a lens, comprising:
    positioning a planar photo sensor surface of an imager mounted on a base substrate relative to a laser beam of a fixed laser, wherein the imager is positioned such that the laser beam is positioned in a desired orientation to the planar photo sensor surface;
    disposing a lens assembly over the imager, wherein:
        a lens of one or more supported optical elements are positioned over the photo sensor surface and the reference laser beam projects through the lens; and
        one or more mounting posts connected to the lens assembly are disposed through one or more mounting apertures in the base substrate;
    rotating the lens assembly about at least a first axis to align the laser beam to be in a desired angular orientation to the photo sensor surface;
    laterally moving the lens assembly to reposition the laser beam at a desired location on the photo sensor surface, wherein the mounting posts move laterally within the mounting apertures in the base substrate; and
    placing adhesive around the posts within the mounting apertures.

11. The method of claim 10, wherein the positioning, rotating and laterally moving, further comprise:
    generating an image output from the imager in response to the laser beam; and
    utilizing the image output to adjust a position of a mounting assembly holding one of the base substrate and the lens assembly.

12. The method of claim 11, wherein the position of the mounting assembly is adjusted in an automated procedure based on the image output.

13. The method of claim 10, upon the moving the reference laser projecting through the lens being located at the to the planar photo sensor surface and prior to placing the adhesive, further comprising:
    projecting an image through the lens;
    moving the lens assembly in a direction normal to the planar photo sensor surface to focus the image.

14. The method of claim 10, wherein the laser beam comprises a circular laser beam, and wherein moving the laser beam to be normal to the planar surface of the imager comprises:
    minimizing a concentricity error of a circular pattern output by the imager in response to the laser beam being projected on the planar photo sensor surface.

15. The method of claim 10, wherein placing the adhesive is performed from a back surface of the base substrate, wherein the lens assembly and imager are disposed on a front surface of the base substrate.

16. The method of claim 10, further comprising:
disposing a compressible gasket around the imager, wherein a base of the lens assembly rests on the gasket.

17. The method of claim 16, further comprising:
advancing the lens assembly in a direction normal to the planar surface of the imager, wherein the gasket is partially compressed.

18. A method for optically aligning an imager mounted on a base substrate with a lens, comprising:
positioning a planar photo sensor surface of an imager mounted on a base substrate relative to a reference laser beam, wherein the imager is positioned such that the reference laser beam is positioned in a desired orientation to the planar photo sensor surface;
disposing a lens assembly over the imager wherein the reference laser beam projects through a lens of the lens assembly;
adjusting the position of the lens assembly to reposition the reference laser beam in the desired position relative to the planar photo sensor surface;
projecting an image through the lens;
moving the lens assembly in a direction normal to the planar photo sensor surface to focus the image; and
affixing the position of the lens assembly relative to the base substrate,
wherein the positioning and adjusting further comprise:
generating an image output from the imager in response to the reference laser beam; and
utilizing the image output to adjust a position of a mounting assembly holding one of the base substrate and the lens assembly.

19. The method of claim 18, wherein the imager is positioned such that the reference laser beam is positioned at the center of and normal to the planar photo sensor surface.

20. The method of claim 18, wherein moving the lens in a direction normal comprises:
compressing or decompressing an elastic gasket disposed around the imager on the base substrate and between a base of the lens assembly and the base substrate.

21. A camera module, comprising:
an imager mounted on a base substrate, the imager having a photo sensor array formed on a planar upper surface;
a plurality of mounting apertures disposed about the imager and extending through the base substrate between the top surface and the bottom surface;
a lens assembly with a base having a plurality of mounting posts spaced for suspended receipt within the mounting apertures;
an elastic gasket disposed about the imager and between the base of the lens assembly and the top surface of the base substrate, wherein the elastic gasket separates the lens assembly from the top surface; and
adhesive disposed about the mounting posts and affixing the mounting posts within the mounting apertures, wherein an optical axis of a lens of the lens assembly is aligned in a desired orientation with the photo sensor array and a focal plane of the lens is disposed on the photo sensor array,
wherein the corresponding cross-dimension of the mounting apertures is at least 1.5 times the cross-dimension of the mounting post.

22. The apparatus of claim 21, wherein the mounting posts and the mounting apertures have identical spacing, wherein the mounting posts have a cross-dimension that is less than a corresponding cross-dimension of the mounting apertures.

23. The apparatus of claim 21, wherein the elastic gasket is continuous about an enclosed aperture, wherein the imager is disposed within the enclosed aperture.

* * * * *